(No Model.) 3 Sheets—Sheet 1.
D. A. SPRAGUE.
CHEESE PRESS.
No. 577,933. Patented Mar. 2, 1897.
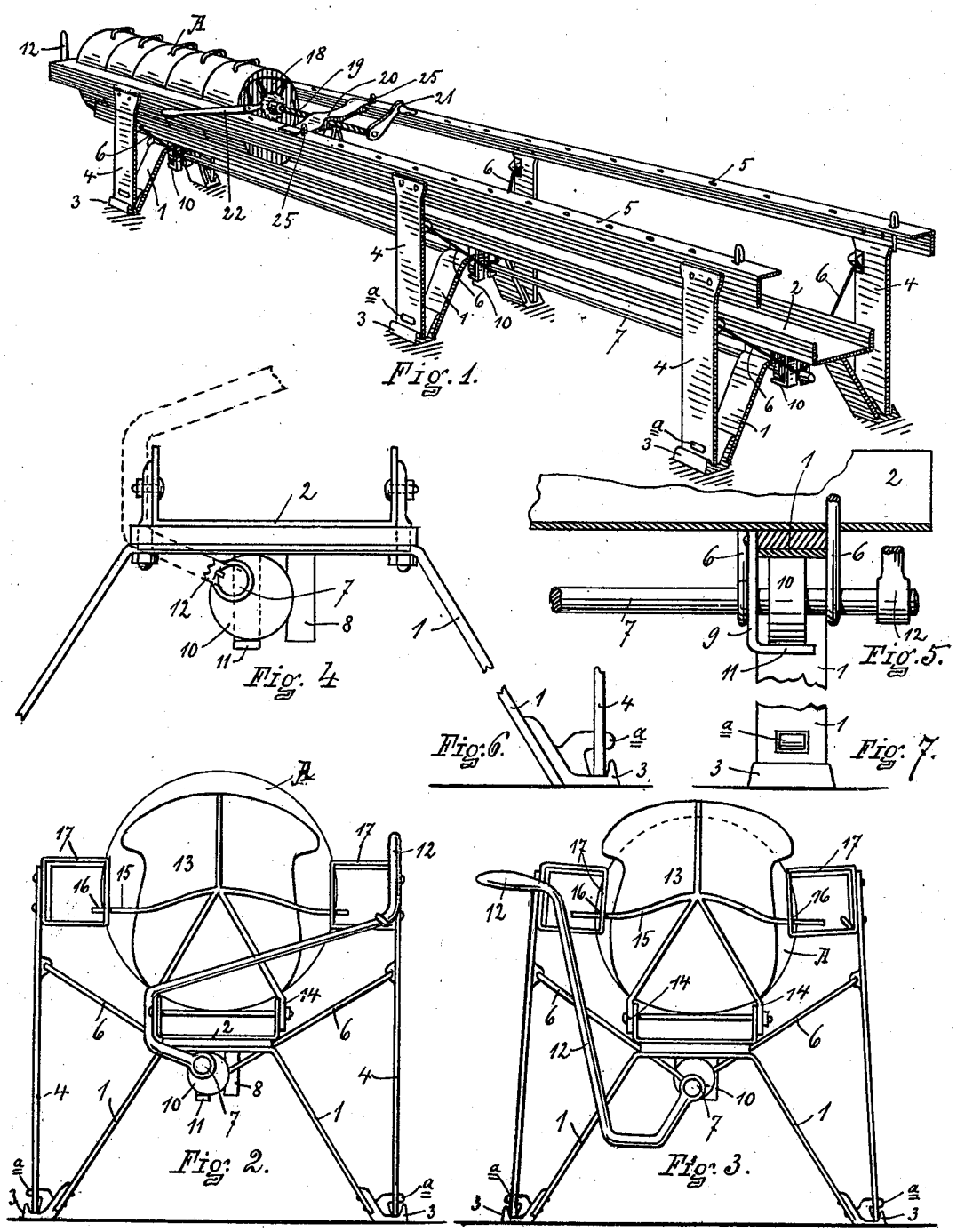
WITNESSES
Rich. A. George.
Phebe A. Tanner.
INVENTOR
DANIEL A. SPRAGUE
By Kisley, Robinson & Love
ATTORNEYS (No Model.) 3 Sheets—Sheet 2.

D. A. SPRAGUE.
CHEESE PRESS.

No. 577,933. Patented Mar. 2, 1897.

WITNESSES
Rich. A. George.
Phebe A. Farmer

INVENTOR
DANIEL A. SPRAGUE
By Risley, Robinson & Love
ATTORNEY'S (No Model.) 3 Sheets—Sheet 3.

D. A. SPRAGUE.
CHEESE PRESS.

No. 577,933. Patented Mar. 2, 1897.

WITNESSES
Rich. A. George.
Phebe A. Tanner.

INVENTOR
DANIEL A. SPRAGUE
By Risley, Robinson & Love
ATTORNEY'S

UNITED STATES PATENT OFFICE.

DANIEL A. SPRAGUE, OF POLAND, NEW YORK.

CHEESE-PRESS.

SPECIFICATION forming part of Letters Patent No. 577,933, dated March 2, 1897.

Application filed July 23, 1896. Serial No. 600,318. (No model.)

*To all whom it may concern:*

Be it known that I, DANIEL A. SPRAGUE, of Poland, in the county of Herkimer and State of New York, have invented certain new and useful Improvements in Gang Cheese-Presses; and I do hereby declare that the following is a full, clear, and exact description of the invention, which will enable others skilled in the art to which it appertains to make and use the same, reference being had to the accompanying drawings, and to the figures and letters of reference marked thereon, which form part of this specification.

Figure 8:
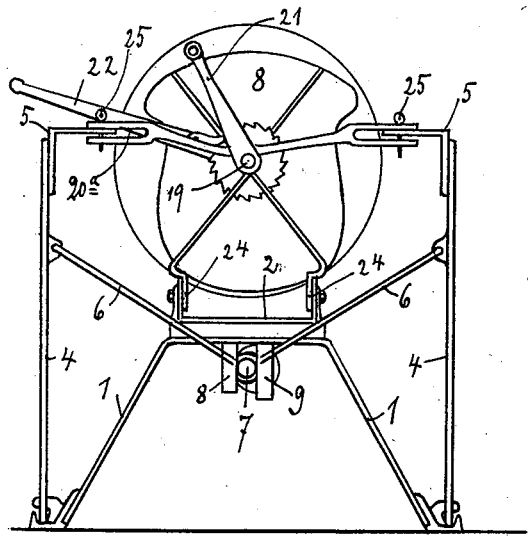
Figure 9:
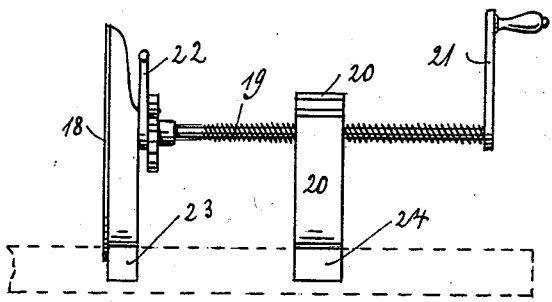
Figure 10:
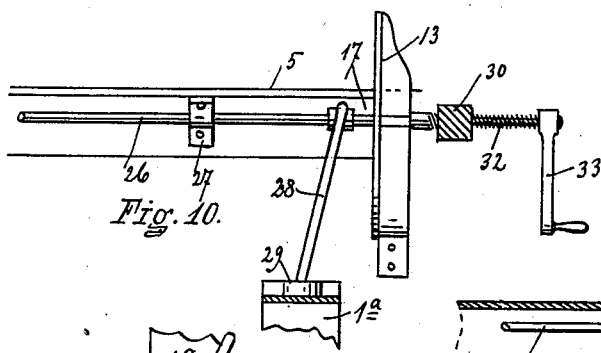
Figure 11:
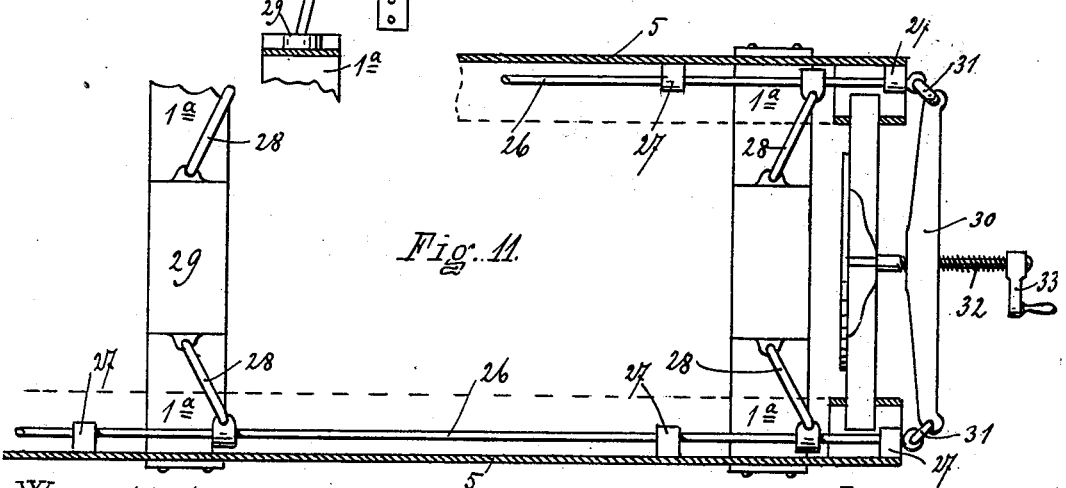
Figure 12:
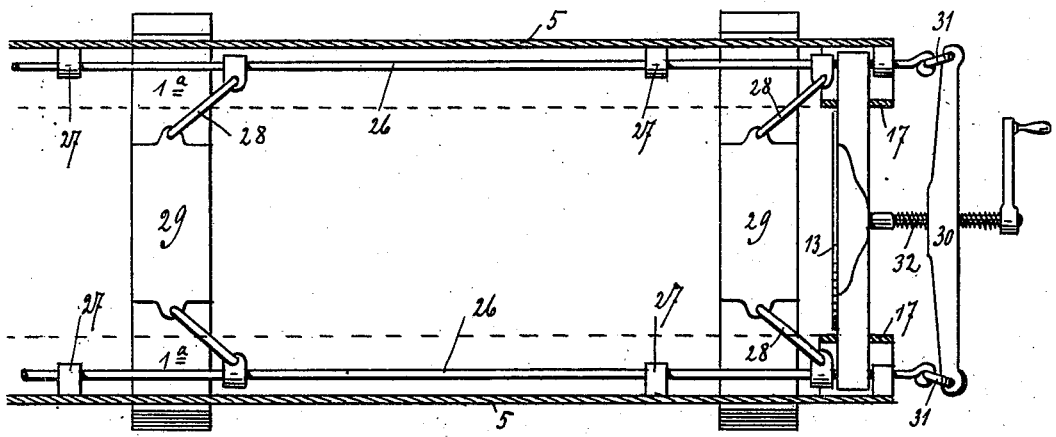
Figure 13:
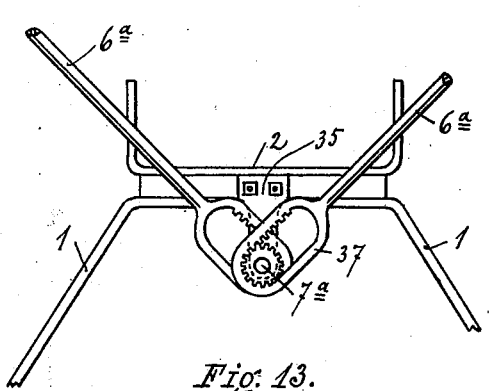
Figure 14:
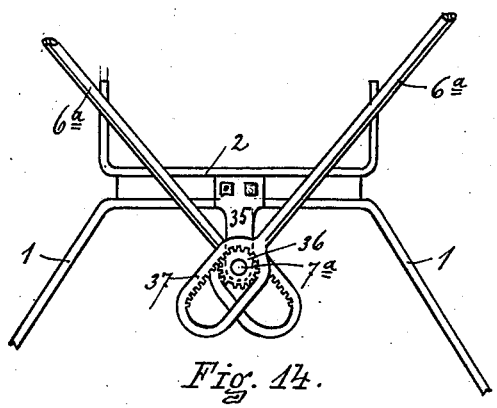

In the drawings, Figure 1 shows a perspective view of my improved gang cheese-press. Fig. 2 shows an end view of the press, being the end on the left hand of Fig. 1. Fig. 3 shows the same with the parts in a different position. Fig. 4 shows in details some of the parts shown in the same figure. Fig. 5 shows details of the shaft and cam for operating the movable side bars of the press. Fig. 6 shows details of the foot of the legs of the press and the hinging-joint of the movable side bars. Fig. 7 shows in side elevation the same parts shown in Fig. 6. Fig. 8 shows an end view of the press, being the right-hand end, as shown in Fig. 1. Fig. 9 shows details of the movable follower, the cross-head which carries the same, and details of this construction. Fig. 10 shows in side elevation details of a modified form of construction. Fig. 11 shows in plan view details of the modified form of construction shown in Fig. 10. Fig. 12 shows the same with the parts in the position which they assume after adjustment. Fig. 13 shows details of the modified form of construction of rack-and-gear pinion for operating the side bars. Fig. 14 shows the same after the completion of their movement.

Referring to the reference figures and letters in a more particular description of the device, 1 1, &c., indicate the pairs of legs which furnish the support for the press and which carry on their middle portions the heavy trough 2, rigidly secured to each set of legs. The legs are provided with feet 3, having a hook projection *a*, on which are engaged the lower ends of the uprights 4 4, &c., which uprights are secured at their upper ends to the side bars 5. These side bars, as shown, are of heavy angle-iron and have their horizontal and vertical webs perforated, as shown. The uprights 4 are connected by rods or links 6 6, &c., with the shaft 7, extending lengthwise of the press under the trough 2. The shaft 7 is capable of a vertical movement between the guides 8 and 9, secured to the legs or frame underneath the trough and projecting downwardly therefrom. The shaft 7 is also provided with eccentrics or cams 10 10, &c., secured on the shaft and adapted to engage with the legs 1, or rather the cross-bars between the legs on the upper side, and with the support 11, extending from the guide 9 on the under side. For operating the shaft 7 and the connecting parts I provide a lever 12, which is bent, as shown, so as to bring it around the end of the trough 2 and is rigidly secured on the end of the shaft 7.

In one end of the press is located a fixed head-block 13, which is secured in position by being bolted at 14 to one end of the trough 2 and is supported by a cross-bar 15, extending across the back of the follower and through openings at 16 16 in the side-bar heads 17, formed by building out the ends of the angle-iron side bars. The movable follower 18 is operated by the screw 19, passing through the screw-threaded opening in the cross-head 20, the screw being operated either by the crank 21 or the lever and pawl 22, as usual in these constructions. The follower 18 is provided with projections 23, which engage on the edges of the trough 2 and support and guide the follower. The cross-head 20 is also provided with similar projections 24, which engage on the wall of the trough 2 and guide and hold the cross-head against sidewise movement. The cross-head is also provided with forked arms 20$^a$, which receive the horizontal web of the angle-iron side bars 5, and the fork in each end is of sufficient length to permit the lateral movement of the side bars hereinafter described.

This press is adjustable so as to use cheese-hoops of various sizes, and is also intended to grip the gang of hoops from the sides and prevent them from "buckling" or getting out of line between the press-screw and the press-head when the pressure is applied.

The operation of the device is substantially as follows: The side bars 5 are separated as far as may be necessary by bringing the lever 12 into the position in which it is shown in Fig. 2. The follower 18, with its cross-head, is slipped back in the press toward the right, as the same is shown in Fig. 1, while the cheese-hoops A are placed in the press. In the press the hoops 5 lie on their sides and are supported by the trough 2. When the desired number of hoops are in the press, the follower 18 is brought up against the last hoop and the screw is adjusted so that the cross-head 20 will be as close to the follower as may be. The pins 25 are then placed through the holes in the horizontal web of the angle-iron side bars, so as to support the cross-head, and the lever 12 is brought over more or less from the position shown in Fig. 2 to that shown in Fig. 3, so that the hoops are gripped laterally by the side bars 5 5. Then by operating the screw 19, either by means of the crank 21 or the pawl-lever 22, the pressure is placed on the hoops and their contents duly pressed. The whey drips into the trough 2 and is discharged at either end, according to the pitch of the press. As the lever 12 is operated to cause the side bars 5 5 to grip the hoops laterally, the shaft 7 is given a downward movement by reason of the cams or eccentrics 10 pressing on the under side of the cross-bar between the legs of the press. In releasing the sidewise pressure on the hoops and by operating the lever 12 from the position shown in Fig. 3 to that shown in Fig. 2, the cams or eccentrics 10 pressing upon the supporting-leaf 11, the shaft 7 is moved upwardly between the guides 8 and 9 and the links 6 are forced outward and with them the side bars 5. The range of movement of the side bars 5 5 is such as to take in two or more sizes in diameter of hoops, as well as to grip the hoops laterally of various sizes. In the movement of the side bars the follower and its cross-head and screw are held in their positions directly on the central line of the press by the projections 23 on the follower 18 and the cross-head engaging with and running on the edges of the trough 2 as ways or guides. The side bars 5 act as guides also for the cross-head of the movable follower.

In the modified form of construction shown in Figs. 10 to 12, inclusive, the shaft 7 is dispensed with and draw-bars 26 26 are provided, supported so as to slide lengthwise in bearings 27 within the angle of the side bars at intervals. These draw-bars 26 are connected by links 28 28 with the ears on a plate 29, secured to the legs 1ª or frame of the press, and at the end of the press the draw-bars are provided with a yoke 30, connected to the ends of the draw-bars by short links 31 and provided with a screw 32 screw-threaded into the yoke coupled to the end of the press and provided with a crank 33, by which it is operated. In operating this modified form of construction to grip the cheese-hoops laterally after they are placed in the press the screw 32 is operated to move the yoke 30 away from the end of the press and from the position shown in Fig. 11 to that shown in Fig. 12. As this is done, it draws on the bars 26 and the links 28, which are brought into a more acute angle with the central line of the press, and in so doing the side bars are closed in so as to grip the cheese-hoops laterally.

In the modified form of construction shown in Figs. 13 and 14 a shaft 7ª, similar to shaft 7, is employed, extending through under the press; but instead of the shaft having a vertical movement it is secured in fixed bearing-pieces 35, provided with gear-pinions 36, which are received in the tooth-rack eyes 37 on the ends of the connecting-rods 6ª, which are otherwise the same as the connecting-rods 6 of the previously-described construction. The arrangement of these parts is such that when the shaft 7ª is given a rotary movement the connecting-rods 6ª are either drawn or thrust, according to the direction in which the shaft is rotated.

It is evident that numerous other modifications and changes than those herein described may be made without departing from the spirit of my invention.

What I claim as new, and desire to secure by Letters Patent, is—

1. In a gang-press a pair of relatively-adjustable hoop-clamping bars and mechanism for moving them relatively in effecting the clamping of the hoops, substantially as set forth.

2. In a gang-press a laterally-movable hoop-clamping bar, mechanism for moving it laterally and an opposing bar, substantially as set forth.

3. In a gang-press a movable follower, a fixed head, laterally-movable side bars and means for operating the side bars, substantially as set forth.

4. In a gang-press a movable follower, a fixed head, laterally-movable side bars movably attached to the fixed head and means for moving the side bars laterally, substantially as set forth.

5. In a gang-press a movable follower, a cross-head, laterally-movable side bars therefor and means for laterally moving the side bars, substantially as set forth.

6. The combination in a gang-press of a frame, a trough-hoop support, a movable follower, a fixed head, laterally-movable side bars and mechanism for moving the side bars, substantially as set forth.

7. The combination in a gang-press of a trough-hoop support, laterally-movable side bars, mechanism for moving the side bars laterally, and a movable follower and support slidingly mounted on the trough, substantially as set forth.

8. In a gang-press a hoop-support, a pair of relatively-adjustable hoop-clamping bars and mechanism for moving them relatively in effecting the clamping of the hoops, substantially as set forth.

In witness whereof I have affixed my signature in presence of two witnesses.

DANIEL A. SPRAGUE.

Witnesses:
PHEBE A. TANNER,
PETER P. SMITH.